April 26, 1966   C. W. EARP   3,248,733
RADIO BEACON

Filed July 3, 1963   2 Sheets-Sheet 1

Inventor
CHARLES W. EARP
By Philip M Bolton
Attorney

April 26, 1966     C. W. EARP     3,248,733
RADIO BEACON

Filed July 3, 1963     2 Sheets-Sheet 2

Inventor
CHARLES W. EARP
By *Philip B. Alton*
Attorney

United States Patent Office 3,248,733
Patented Apr. 26, 1966

3,248,733
RADIO BEACON
Charles William Earp, London, England, assignor to International Standard Electric Corporation, New York, N.Y., a corporation of Delaware
Filed July 3, 1963, Ser. No. 292,635
Claims priority, application Great Britain, July 20, 1962, 28,061/62
9 Claims. (Cl. 343—106)

This invention relates to radio navigation systems in which the atmospheric propagation path length of a transmitted wave is varied cyclically by the successive coupling of spaced antennas either to the transmitter or to the receiver.

This cyclic variation results in a frequency modulation in the receiver due to the Doppler effect, and such systems are therefore often called Doppler navigation systems.

The invention is applicable either to the beacons or to the direction finders in Doppler navigation systems.

The invention as applied to radio beacons concerns those in which a pair of waves is transmitted in such manner that they appear to be radiated from points moving relative to each other in a circular manner.

As applied to radio direction finders, the invention relates to those which a single wave which is received appears to be picked up from two different points moving relative to each other in a circular manner.

In most existing Doppler systems, a wave is radiated or picked up from the antennas of a circular array in turn. In existing Doppler beacons, the other wave is radiated from a single antenna and has a fixed frequency separation from the first wave. In Doppler direction-finders, the wave is generally picked up simultaneously by a single antenna and changed in frequency by a fixed amount before being fed to the rest of the receiving equipment.

In such existing systems, whether the array of antennas is at the beacon or at the direction-finding end, the antennas of the array should not be separated by more than one third of the operating wavelength to ensure that the apparent movement of the radiating or picking up point be reasonably smooth.

This practical restriction on antenna spacing in the array means that the array cannot be arbitrarily increased in cross-section without either having more antennas or increasing the operating wavelength.

If the cross-section of the array could be increased sufficiently, vehicles especially aircraft could be instrument navigated to points within the array. This would be especially advantageous for aircraft of the type landing from steep or vertical glide paths, since these could then be guided right to touch down within the array in fog or blackout conditions, and the array itself would afford less physical obstruction.

The invention aims to provide a Doppler beacon or direction finder having a larger array of antennas successively coupled to transmitting or receiving equipment without necessarily changing the number of antennas or the wavelength used in existing systems of the type described above.

According to the invention, there is provided Doppler radio nagivation equipment including an arangement of antennas and means for coupling the antennas two at a time in repeated sequences to respective first and second channels in the equipment, the arrangement and the coupling sequence being such that the thereby simulated movement of the antenna coupled to the first channel relative to that coupled to the second channel is around a circle of diameter less than the general cross-section of the arrangement.

Embodiments of the invention will now be described with reference to the accompanying diagramamtic drawings, in which.

Figure 1:
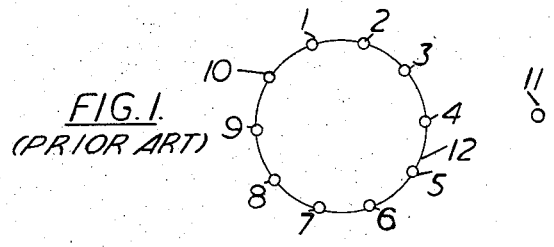
FIG. 1 shows an antenna arrangement as commonly used at present in Doppler beacons.

Referring to FIG. 1, there are shown eleven antennas 1 to 11 of which the antennae 1 to 10 lies equispaced on a circle 12 at intervals of one third of a wavelength, the antenna 11 being positioned anywhere in the vicinity. The circle 12 has a diameter of about one wavelength at the operating frequency.

Although most prior art beacons have far more antennas in the ring, often fifty, the principles are the same and the explanation simpler for the ten antennas as shown in the drawings.

The known antenna arrangement of FIG. 1 is operated by energizing the antennas 1 to 10 singly in turn around the circle 12 with waves at a first frequency, say $f_1$, and energizing the antenna 11 continuously with waves at a second frequency $f_2$. The frequencies $f_1$, $f_2$ lie in the same VHF frequency band, and are separated by 9960 c./s. in conformity with international standards. The energization cycle of the antennae 1 to 10 is repeated at 30 c./s., also according to established convention.

The successive energization of the antennas 1 to 10 results in the simulation of a source of radiation of frequency $f_1$ moving around the circle 12 of about one wavelength diameter at 30 c./s.

The simulated movement will result in the reception at a distant receiving point of a first wave of the first frequency $f_1$, frequency modulated at 30 c./s. repetition rate. The receiving point will also experience the second wave of frequency $f_2$.

The sources of the waves will appear to the receiver to be moving relative to each other in a circle of diameter one operating wavelength, $f_1$ being very close to $f_2$, although in FIG. 1 it is only the source of waves at frequency $f_1$ that appears to move.

A receiver mounted on an aircraft and designed to co-operate with the beacon will have means to beat the two waves together, wherein a beat wave having the difference frequency of 9960 c./s. will result. The beat wave will have a frequency modulation of the same repetition rate and deviation as had the first wave due to the simulated movement.

If, as is customary, the antenna arrangement is horizontal, the frequency modulation will depend in phase on the bearing of the receiver from the beacon, and its deviation will depend on the angle of elevation, being zero when the aircraft is vertically above the centre of the circle 12.

To obtain the bearing, the energization cycle of the antennae 1 to 10 must be known at any instant in phase at the receiving point, and this knowledge is transmitted from the beacon by means of an amplitude modulation phase related to the energization cycle, the AM being transmitted on one of the two waves. The AM is derived at the receiver and is compared in phase with the aforementioned frequency modulation to give the bearing of the receiver from the beacon.

The angle of elevation of the receiver from the beacon is obtained by calculating the expression $\cos^{-1}(a_1/a_0)$ where $a_1$ is the observed deviation of the frequency modulation on the beat wave, and $a_0$ is the deviation which would be observed from the same horizontal level as the antennae 1 to 10. Thus $a_0$ is a constant for a given beacon and depends on the diameter of the circle 12. Knowledge of the phase of the energization cycle of the antennae 1 to 10 is not necessary for elevation determination, and so if a beacon is to be used only for this purpose, there need be no amplitude modulation or other indication of the energization cycles transmitted from the beacon.

To land vertically at the centre of the circle 12, an aircraft equipped with a co-operating receiver has only to manoeuvre so as to keep the deviation at zero, since cos $a_1$ will be zero.

The diameter of the circle 12, i.e. one operating wavelength is about 3 metres at the typical operating frequency of 120 mc./s.

Although only ten antennae are shown in FIG. 1 as energized to simulate a circularly moving source, it is more usual in beacons to have about fifty antennae on the circle 12 spaced by about one third of an operating wavelength, the diameter of the array being then about five wavelengths.

Figure 2:
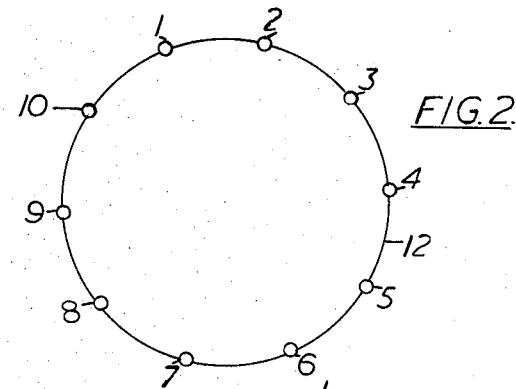
FIG. 2 shows an antenna arrangement in a Doppler beacon according to the invention.
Figure 3:
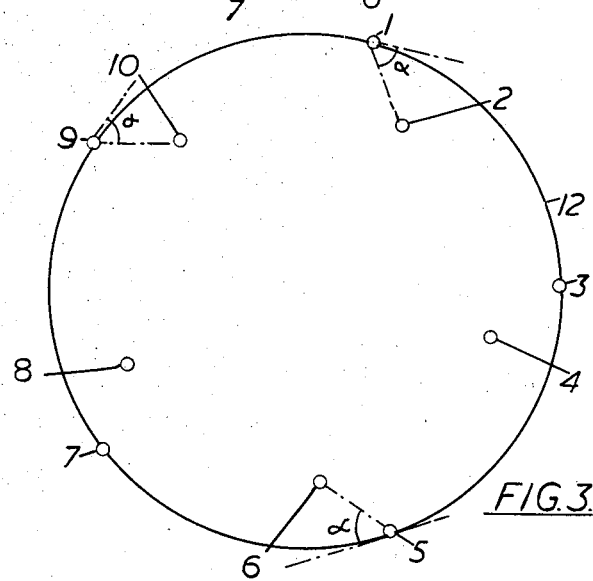
FIG. 3 shows another antenna arrangement in a beacon according to the invention.

Beacons having antenna arrangements according to the invention such as shown in FIGS. 2 and 3 operate similarly to those described for FIG. 1 in that a pair of sources appear to be in movement relatively to each other in a circle of about one operating wavelength diameter, but the actual simulated movements are different. The co-operating receivers are similar, and derive beat waves of centre frequency 9960 c./s. having frequency modulations depending on the apparent relative movement of simulated moving sources. Both simulated wave sources are in apparent movement during operation of the arrangements of FIGS. 2 and 3 whereas only one apparently moves in FIG. 1, the other being fixed.

Referring more particularly to FIG. 2, there are shown ten antennas 1 to 10 each spaced from its neighbours by one half of an operating wavelength and lying in a circle of about one and a half wavelengths diameter.

In operation of the beacon, the first wave of frequency $f_1$ is coupled to the antennas 1 to 10 in turn, and the second wave of frequency $f_2$ is similarly coupled, but the antenna energized by the second wave at any moment is always one adjacent to that energized by the first wave. As for FIG. 1, the energizing cycle of the first wave is repeated at 30 c./s. and is a progression around the circle 12. The energizing cycle of the second wave follows or leads that of the first wave by a half-wavelength, i.e. the interval between adjacent antennas.

There are thus two simulated circularly moving sources, the apparent movement of each being on the circle 12 of 1½ wavelengths diameter. The apparent relative movement between the sources is however a circular movement of 1 wavelength diameter. Therefore the frequency modulation of the beat wave produced in a co-operating receiver by reception of the first and second waves will have the same deviation and repetition frequency as if the receiver were co-operating with a beacon having the antenna arrangement shown in FIG. 1.

The advantage of the antenna arrangement of FIG. 2 when used in the manner described is that the diameter is some 50% larger than that of the antenna arrangement in FIG. 1. If, instead of the ten antennas shown, there are more antennas, this advantage is correspondingly increased. For 50 antennas having 2½λ spacing, the arrangement would have about 40 wavelengths, or 120 metres diameter, and so be better able to contain a landing aircraft; the relative circular movement of the two simulated sources for one switching step being still about λ/3 as in FIG. 1.

FIG. 3 shows another arrangement where the ten antennas 1 to 10 are still further spread out in five groups of two. The antennas 1, 3, 5, 7 and 9 are equispaced on a circle 12 of large diameter, and are spaced from the antennas 2, 4, 6, 8, 10 respectively by distances of a half wave-length at the operating frequency, along lines inclined at an angle α to the circle 12 at the positions of the antennas 1, 3, 5, 7 and 9, respectively.

In operation, the first and second waves of frequency $f_1$ and $f_2$, separated by 9960 c./s. are coupled to the antennas 1 to 10 repeatedly at 30 c./s. according to the following schedule:

| 1st wave | 1 | 8 | 3 | 10 | 5 | 2 | 7 | 4 | 9 | 6 |
|---|---|---|---|---|---|---|---|---|---|---|
| 2nd wave | 2 | 7 | 4 | 9 | 6 | 1 | 8 | 3 | 10 | 5 |

Thus the first and second waves are coupled at any instant to adjacent antennas, these being a half wavelength apart, and there are thereby simulated a pair of moving sources. Although the simulated movement of each is complicated, the apparent movement between the two is again circular of one operating wavelength diameter. Thus in a co-operating receiver there will again result a beat wave having the same characteristic frequency modulation as observed during co-operation with the beacon described with reference to FIG. 1.

The circle 12 may be made as large as is practical considering the lengths of feeder cable involved, terrain etc. There must, however, be half wave-length separation between the antennas in each group of two, and the line joining the two antennas in each group must make the same angle α with the tangent to the circle to produce the same effect in receivers designed to co-operate with the prior art type of beacon described with reference to FIG. 1.

The actual diameter of the circle 12 and the angle α are immaterial in FIG. 3. The arrangement shown in FIG. 2 is just a particular case of that described for FIG. 3 wherein the angle α is made zero, and wherein the diameter of the circle 12 is chosen so that the antennae are equispaced at half wavelength.

It is emphasized that although ten antennas only are shown as successively energised to simulate the source movement for simplicity of explanation, in general beacons have far more. Also it is emphasized that although the relative movement of the two sources in these embodiments is λ/3 along the arc of the circle of relative movement for each switching step, this relative movement could be less than λ/3. If it exceeds this figure, the discontinuity on switching becomes so great that it is probably impracticable to evaluate the FM in a practical receiver.

A preferred number of antennas is fifty, and a coupling schedule for these positioned in twenty five groups of two analogously to the arrangement of FIG. 3 is as follows:

| Coupling step | 1st wave | 2nd wave | Coupling step | 1st wave | 2nd wave |
|---|---|---|---|---|---|
| 1 | 1 | 2 | 26 | 2 | 1 |
| 2 | 28 | 27 | 27 | 27 | 28 |
| 3 | 3 | 4 | 28 | 4 | 3 |
| 4 | 30 | 29 | 29 | 29 | 30 |
| 5 | 5 | 6 | 30 | 6 | 5 |
| 6 | 32 | 31 | 31 | 31 | 32 |
| 7 | 7 | 8 | 32 | 8 | 7 |
| 8 | 34 | 33 | 33 | 33 | 34 |
| 9 | 9 | 10 | 34 | 10 | 9 |
| 10 | 36 | 35 | 35 | 35 | 36 |
| 11 | 11 | 12 | 36 | 12 | 11 |
| 12 | 38 | 37 | 37 | 37 | 38 |
| 13 | 13 | 14 | 38 | 14 | 13 |
| 14 | 40 | 39 | 39 | 39 | 40 |
| 15 | 15 | 16 | 40 | 16 | 15 |
| 16 | 42 | 41 | 41 | 41 | 42 |
| 17 | 17 | 18 | 42 | 18 | 17 |
| 18 | 44 | 43 | 43 | 43 | 44 |
| 19 | 19 | 20 | 44 | 20 | 19 |
| 20 | 46 | 45 | 45 | 45 | 46 |
| 21 | 21 | 22 | 46 | 22 | 21 |
| 22 | 48 | 47 | 47 | 47 | 48 |
| 23 | 23 | 24 | 48 | 24 | 23 |
| 24 | 50 | 49 | 49 | 49 | 50 |
| 25 | 25 | 26 | 50 | 26 | 25 |

While the importance of compatibility with existing receivers has been stressed above, the principles of the invention may be applied to beacons not designed for such compatibility. Co-operating receivers may then have to be designed especially for the purpose, but their design would involve no new principles, any arrangement for deriving beat waves from the first and second incident waves and evaluating the frequency modulation on the beat waves being the only requirements.

For this reason, there is no necessity that the energizing cycles should be repeated at 30 c./s., nor that the first and second waves to be separated in frequency by 9960 c./s., but these values conform with existing aerial navigation equipment built to 1CAO standards.

It is envisaged that the principles of the invention may be applied to beacons for guiding any aircraft to touchdown, but it is particularly advantageous when the aircraft are of the vertically landing type since they require less room within the antenna arrangement, and then can manoeuvre so as to maintain an FM deviation at zero. Such beacons may also be used otherwise than for landing aircraft, in fact for any of the uses to which the beacon described for FIG. 1 may be put, such as guiding aircraft in flight, or guiding land vehicles, ships, etc.

Figure 4A:
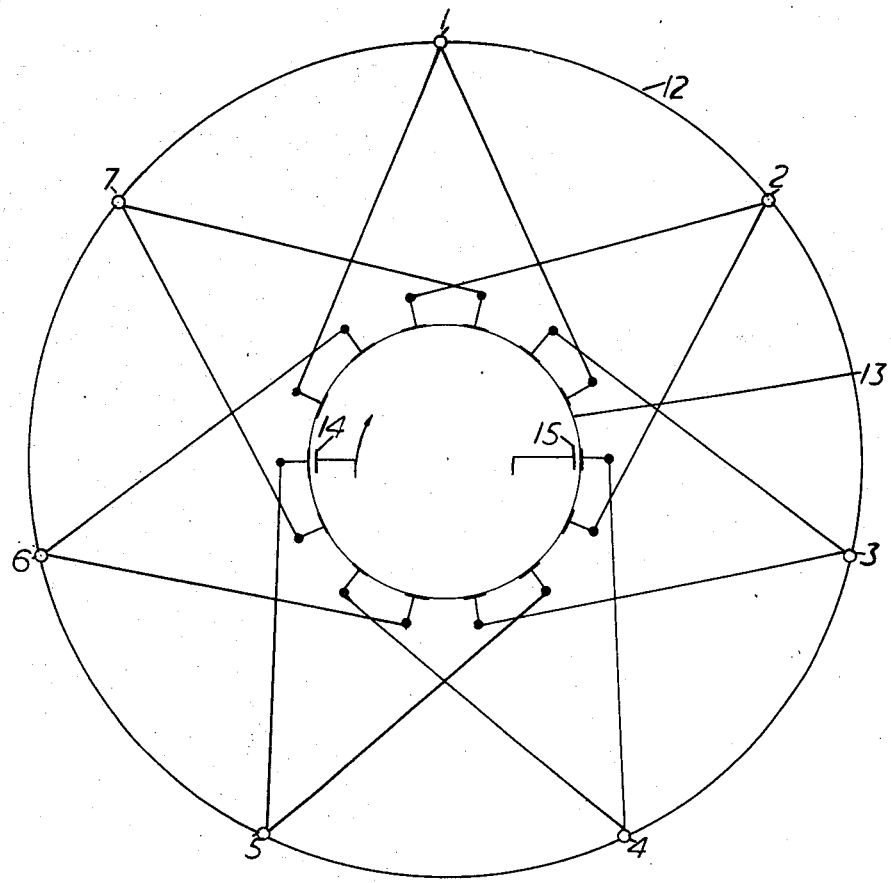
FIG. 4a shows an antenna system and commutator.

Referring now to FIG. 4A and B, the former shows an antenna system and a double commutator device to pick up a wave and to provide a pair of outputs, while the latter shows the essential elements in direction finder receiving equipment to evaluate the pair of outputs.

In FIG. 4A, seven omnidirectional antennas 1 to 7 are arranged equispaced on a horizontal circle 12, and are each connected to a respective pair of fourteen fixed capacitive segments lying on a circle 13. A further pair of movable capacitive segments 14 and 15 are arranged to pass close to the fixed segments in clockwise order around the circle 13, thereby providing separate capacitive coupling of diametrically opposite fixed segments to separate input channels of the receiver shown in FIG. 4B.

The order of coupling by the commutator switch antennas to the segments 14 and 15 is as follows starting from the position shown in FIG. 4A:

| Segment 14 | 5 | 1 | 6 | 2 | 7 | 3 | 1 | 4 | 2 | 5 | 3 | 6 | 4 | 7 |
|---|---|---|---|---|---|---|---|---|---|---|---|---|---|---|
| Segment 15 | 4 | 2 | 5 | 3 | 6 | 4 | 7 | 5 | 1 | 6 | 2 | 7 | 3 | 1 |

Thus at any moment the antennas coupled are adjacent ones, and the line joining the antennas coupled rotates clockwise by the same angle, i.e. $2\pi/14$ between successive coupling steps. For instance, considering the first two coupling steps of the table, the lines joining the antennas 5 and 4 and the antennas 1 and 2 are inclined to each other at $2\pi/14$. One revolution of the segments 14, 15 on the circle 13 lasts 1/30 second, and results in each antenna being coupled twice to each of the segments 14, 15.

Figure 4B:
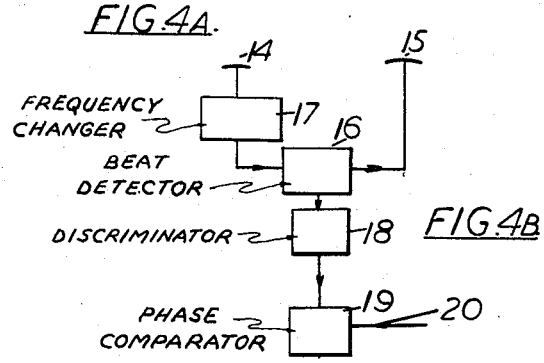
FIG. 4b shows a receiver for use therewith.

The two outputs of the antenna coupling an arrangement of FIG. 4A as picked up from the antennas by the moving segments 14, 15 are coupled through sliprings to separate input channels of the receiver equipment of FIG. 4B. The equipment consists of a beat detector 16 coupled directly to the two channels, one of which has a 9960 c./s. frequency changer 17 coupled to the segment 14. A 9960 c./s. beat wave from the beat detector 16, carrying a frequency modulation of 30 c./s. repetition frequency due to the commutation of the receiving antennas is fed to a discriminator 18, from which the detected FM signal is passed to a phase comparator 19 together with a 30 c./s. signal on a line 20 indicative of the phase of commutation. The phase comparison gives an indication of the bearing of the transmitter, and the magnitude of the detected FM signal indicates the cosine of the angle of elevation of the transmitter from the direction finder.

The frequency changer 17 is of the single sideband type and the beat detector 16 actually contains a heterodyning circuit, so that the heat detecting is performed at an intermediate frequency.

The separation of adjacent antennas on the circle 12, FIG. 4A is about two thirds of a wavelength to provide that the locus of the antenna being coupled to one receiver channel relative to the antenna coupled to the other channel be a circle of diameter $4\lambda/3$, and thus that for each coupling step, the relative movement around this circle is $4\lambda/3$, $\pi/14$ or about $\lambda/3$.

The diameter of the circle 12 is about $3\lambda/2$, i.e. larger than the diameter of the circle of relative movement $4\lambda/3$ in accordance with the principles of the invention.

It is repeated that the maximum progression of $\lambda/3$ around the circle of relative movement in one coupling step is chosen in practical consideration of the types of receivers at present used in Doppler navigation systems. If the progression were increased above this figure, the discontinuity or transient at each coupling step would be too great for existing receiving equipment to cope with. However, whatever the maximum progression chosen around the circle of relative movement, consequential adjustment to the dimensions in the embodiments herein described, either as beacons or as direction finders, would not affect the principles of the invention as claimed.

The coupling system shown in FIG. 4A could be applied to a beacon by arranging that the moving segments 14, 15 be connected to separate transmitter output channels of different frequencies. The frequency separation need not be 9960 c./s., but should be both large compared with the commutation frequency and small compared with the operating frequency (usually a VHF).

The coupling system shown in FIG. 4A, can be applied to any odd number of antennas in a circular array, although if the number is less than seven, the diameter of the array is smaller than the relative circle of movement, and so the system would not have the advantage according to the invention. As the number of antennas increases, this space advantage increases—for instance using 25 equispaced antennas 1, 2, 3 . . . 25, and coupling them sequentially as follows to a pair of equipment channels 1 15 2 16 3 17 . . .
2 14 3 15 4 16 . . .

the diameter of the array would be $22\lambda$, while that of the circle of relative movement would be only about $5\lambda$, assuming the progression of $\lambda/3$ per coupling step around the circle of relative movement to be maintained.

If the antenna arrangement of FIG. 4A contains an odd number of equispaced antennas formulated by the general expression $(2n+1)$, the coupling sequence would be:

1. $(n+3)$ 2. $(n+4)$. 3 and so until

2. $(n+2)$ 3. $(n+3)$. 4 the $(2n+1)$. $(n+2)$ and then repeating

1. $(n+1)$

Thus $(4n+2)$ samples are taken and the bearing of the antenna coupled to the first channel from that coupled to the second channel alters by $2\pi/(4n+2)$ in the same sense (clockwise or anticlockwise depending on whether the antennas are numbered clockwise or anticlockwise) with each coupling step.

All of the inventive coupling systems shown and described have the common essential feature with the prior art system of FIG. 1 that the relative movement between the antennas coupled to the first and second channels of electronic equipment is a circle; this circle being smaller than the actual antenna arrays. Furthermore all have the progression per coupling step around the circle of relative movement equal to $\lambda/3$. This progression may be arbitrarily decreased, but not increased unless the receiving equipment can cope with the consequential transients on each switching step.

The large antenna arrays permissable in Doppler navigation systems by the application of the invention gives an added advantage of receiving or transmitting over a wide base. It is anticipated however most Doppler stations will have sufficiently good foregrounds not to require wide bases just to minimize multiple path interferences.

All of the systems described can be used in Doppler beacons or direction finders, but in beacons the rotating coupling should be capable of handling the necessary power.

Clearly all of the systems can be arranged so that coupling of the antennas takes place in generally anticlockwise direction instead of generally clockwise as illustrated for all of the embodiments herein.

In some of the embodiments, the antennas are all arranged on a circle 12. This circle is not the same as, but is larger than, the circle of relative movement between the coupled antennas in accordance with the principles of the invention.

It is affirmed that no antennas within the system are actually in physical movement, but successive coupling gives the simulation of movements of two single antennas coupled to the first channel and the second channel. The relative movement between these two simulated movements is in every case circular.

More complicated arrangements of antenna coupling arrangements while maintaining the provision of relatively circularly moving sources will occur to those skilled in this particular art.

It is to be understood that the foregoing description of specific examples of this invention is not to be considered as a limitation on its scope.

What I claim is:

1. Doppler radio navigation equipment having first and second channels including an arrangement of antennas, and means for coupling the antennas two at a time in repeated sequences to said respective first and second channels in the equipment, the arrangement and the coupling sequence being such that the thereby simulated movement of the antenna coupled to the first channel relative to that coupled to the second channel is around a circle of diameter less than the general cross-section of the arrangement.

2. Equipment according to claim 1 wherein the antennas lie equispaced on a circle, the sequence of coupling of each of the channels to an antenna is either in clockwise or anticlockwise order around the circle and the two antennas coupled at any one time are adjacent each other on the circle.

3. Equipment according to claim 1 wherein there is an odd number designated by $(2n+1)$ of antennas in the arrangement numbered in order around a circle, and wherein the antennas are coupled to the two channels in sequence in accordance with the following formulae:

first channel—1. $(n+3)$. 2. $(n+4)$. 3. $(n+5)$ ... $(n+2)$
second channel—2. $(n+2)$. 3. $(n+3)$. 4. $(n+4)$ ... $(n+1)$ the number $(2n+1)$ being subtracted from those expressions numerically greater than $(2n+1)$.

4. Equipment according to claim 1 wherein the antennas are arranged in pairs, the antennas in all the pairs having the same separation, which separation defines the radius of the said circle of relative movement, the coupling being such that the antennas coupled to the first and second channels at any time are those of a pair.

5. Equipment according to claim 4 wherein the antenna pairs are distributed around a circle of radius large compared with the said separation.

6. Equipment according to claim 1 being direction finding equipment, one channel having a frequency changer, and also including a beat detector coupled to both channels.

7. Equipment according to claim 6 wherein frequencies are changed by 9960 c./s.

8. Equipment according to claim 7 wherein the circle of relative movement is described at thirty times per second.

9. Equipment according to claim 1 being beacon equipment, wherein the two channels contain generated waves in the VHF band separated in frequency by 9960 c./s.

References Cited by the Examiner

UNITED STATES PATENTS

| | | | |
|---|---|---|---|
| 2,962,715 | 11/1960 | Byatt | 343—118 X |
| 3,115,633 | 12/1963 | Kramar et al. | 343—106 |

CHESTER L. JUSTUS, *Primary Examiner.*

LEWIS H. MYERS, *Examiner.*

R. E. BERGER, *Assistant Examiner.*